United States Patent [19]

Krishnan

[11] Patent Number: 5,000,787
[45] Date of Patent: Mar. 19, 1991

[54] LOW MISTING PRINTING INK

[75] Inventor: Ramasamy Krishnan, Sewaren, N.J.

[73] Assignee: Sun Chemical Corporation, Fort Lee, N.J.

[21] Appl. No.: 375,543

[22] Filed: Jun. 30, 1989

[51] Int. Cl.⁵ .............................................. C09D 11/02
[52] U.S. Cl. ........................................ 106/32; 106/23; 106/285
[58] Field of Search ............................ 106/23, 32, 285

[56] References Cited

U.S. PATENT DOCUMENTS

| | | | |
|---|---|---|---|
| 3,963,501 | 5/1976 | Zalesky | 106/20 |
| 4,217,265 | 8/1980 | Dietz et al. | 106/23 |
| 4,281,329 | 7/1981 | Yano et al. | 106/20 |
| 4,321,094 | 11/1982 | Batt et al. | 106/32 |

OTHER PUBLICATIONS

J. M. Fetsko et al., "Misting of Printing Inks", American Ink Maker, Mar., 1979, p. 47 et seq.
"Ink Troubleshooting Tips", American Printer, Feb., 1982, pp. 40-45.
M. Bryan, "The Problem of Ink Fly", The Canmaker, Oct., 1988, pp. 37 and 39.

Primary Examiner—Mark L. Bell
Assistant Examiner—Helene Klemanski
Attorney, Agent, or Firm—Jack Matalon

[57] ABSTRACT

A printing ink of low misting properties comprising a dispersion of a pigment in a vehicle containing a hydrocarbon oil and an antimisting additive comprising an organic acid phosphate such as tridecyl acid phosphate (which is preferred), glycerol or propylene carbonate.

12 Claims, No Drawings

LOW MISTING PRINTING INK

This invention relates to printing ink having low misting properties. Low misting is achieved by incorporating a compound selected from the group consisting of organic acid phosphate, glycerol and propylene carbonate.

BACKGROUND OF THE INVENTION

Ink mist is the term popularly applied to airborne droplets of ink ejected from press distribution systems and other rotating rollers. The mist is not only extremely annoying to personnel, but it also contaminates the pressroom and in some instances becomes a serious fire hazard as well as a major problem because of its health hazard potential in the working environment. Indeed, ink mist is one of the major factors limiting the speed of newspaper printing.

It is generally accepted that the misting phenomena is a direct consequence of the ink transfer process. When two rollers containing ink are rotated on contact, ink splitting takes place with the formation of filaments which elongate and then rupture. When the filaments break in more than one place, the free fragments coalesce into droplets and may be propelled into the atmosphere. Accordingly, the shorter the filaments produced on splitting, the smaller should be the number of mist particles generated. This assumption is the basis for mist reduction through alterations to the rheological properties of ink.

It has been established that, in the process of formation, ink mist acquires an electric charge, and both positively and negatively charged particles may exist in the mist. It has also been established that the magnitude of the charge of the particles of a given ink depends primarily on the rate of film separation and therefore directly on the press speed.

Press speed is the most important factor in ink misting. At lower press speeds, ink misting is usually negligible. At intermediate speeds, i.e. above 2,000 feet per minute, misting is a serious problem in newspaper printing. At speeds exceeding 2,500 feet per minute, misting becomes the major limiting factor. In this connection, it should be noted that changes in ink characteristics required for printing satisfactorily at high speeds render the ink more prone to misting.

Surveys of literature and prevailing practice regarding the misting of printing inks exist in the prior art, e.g. "Misting of Printing Inks", by Fetsko and Lavelle, *American Ink Maker*, March 1979, p. 47 et seq.; "Ink and Paper in the Printing Process", by Voet, Interscience Publishers, N. Y. (1952) pp. 79-86; "Ink Troubleshooting Tips", American Printer (1982) pp. 40-45; pp. 37 and 39; "The Problem Of Ink Fly" by Bryan, *The Canmaker*, (Oct. 1988); U.S. Pat. Nos. 3,963,501 and 4,321,094, etc.

Adjusting press operating variables, e.g. temperature, humidity, ink film thickness, roller settings, etc. have resulted in only limited success in achieving reduced misting. Furthermore, it is known that while additions to inks such as pigment loading, amine-treated montmorillonites, foam suppressors, water, electrolytes, amines and amides and asbestos have had some beneficial effect on reducing ink misting, these various methods do not permit high speed printing without concomitant misting.

It should be understood that any materials added to printing ink formulations to reduce misting must, at the same time, not adversely affect the rheological and lithographic properties of the ink since the quality of the final print depends greatly upon such rheological properties. Ink distribution and transfer, misting, print sharpness and clarity, print uniformity and density, penetration, rub resistance, piling and scumming are all related to the rheological characteristics of the ink used. Thus materials such as kaolin are not entirely satisfactory as mist-reducing additives because high shear viscosity buildup results in poor transferability and high loading of such types of clays interact with fountain solutions resulting in scumming. It has also been found that cationic surfactants which are frequently used for reducing misting of printing inks suffer from the disadvantage that they encourage improper emulsification and also result in deposits on the rollers when printing at high speeds is attempted, since most rollers are negatively charged and the cationic surfactant is attracted to them. Most anionic surfactants have been found to be inefficient for solving the misting problem.

SUMMARY OF THE INVENTION

A group of additives has now been discovered that makes it possible to drastically reduce or eliminate ink misting and still print at high speeds. The printing ink will comprise a typical dispersion of a pigment ink vehicle containing a hydrocarbon oil. The additive which results in reduction or elimination of misting comprises a compound selected from the group consisting of an organic acid phosphate, glycerol and propylene carbonate. Preferably, the additive consists of the organic acid phosphate. In ink formulations which contain polymers as part of the vehicle, it is desirable to include a small amount of glycerol in the formulation to help stabilize the formulation.

Generally, the antimisting additive of the present invention will be utilized in an amount of 0.1 to about 4 wt. %, preferably 0.3 to 2 wt. %, based on the weight of the ink. The hydrocarbon oil will be present in typical amounts, e.g. about 50 to about 95 wt. %, based upon the weight of the vehicle, whereas the pigment will be present in a typical amount of about 5 to about 30 wt. %, based upon the weight of the ink.

The preferred antimisting additive is an organic acid phosphate. In such phosphates, the organic group may be a straight or branched chain alkyl, aryl, alkaryl, aralkyl or heterocyclic group containing 2 to 16 carbon atoms; preferably, the organic group is a straight chain alkyl group containing 8 to 13 carbon atoms, such as tridecyl acid phosphate.

The vehicle for the printing ink refers to that component or mixture of components which serves as a dispersing and carrying medium for the pigment particles of the printing ink and which also imparts appropriate rheological properties such as plasticity, flow, viscosity, etc. to the printing ink. The vehicle contains any of the well-known oils, varnishes, resins, and plasticizers used in the production of printing inks. If desired, natural and synthetic waxes and other standard ink additives may be incorporated into the vehicle. Suitable hydrocarbon oils include: mineral oils having a viscosity of 750 to 2400 S.U.S., hydrocarbon oils having a boiling range of 400 to 600.F., and the like.

The pigments may be any of those which are conventionally used in printing inks, e.g. Carbon Black, Lithol Red, Red Lake C, BON Red, Lithol Rubine, Naphthol Red, Carbazole Violet, Phthalocyanine Blue, Phthalocyanine Green, Monoarylide and Diarylide Yellow pigments, etc.

The printing ink of this invention may be prepared by conventional techniques, e.g. by preparing a dispersion of the components using equipment such as the typical 3-roll mill. All of the components may be mixed at one time or a printing ink base comprised of a dispersion of the pigment in a small amount of vehicle may be prepared and the resultant printing ink base may thereafter be diluted further with typical let-down varnishes. The antimisting additive of the present invention may be added concurrently with all of the other components, or may be added to the components during the preparation of the printing ink base or during the dilution of the printing ink base with the let-down varnish. Preferably, the antimisting additive is added to the printing ink base.

The following examples shall serve to illustrate the benefits achieved by the present invention. Unless otherwise indicated, all parts are by weight.

EXAMPLE 1

A letterpress newspaper ink was formulated from the following components:
Carbon Black: 12%
Mineral Oil 2400 SUS: 20%
Bituminous Asphalt: 4%
Mineral Oil 750 SUS: 62%
Tridecyl Acid Phosphate: 2%

The ink prepared according to the above formulation was printed on typical newspaper stock at a print speed of approximately 2,500 ft./min. No misting was observed with this ink, i.e. the ink exhibited a mist rating of 0. When the same ink was prepared without the tridecyl acid phosphate, the ink, upon printing on the same type of newspaper stock and at the same print speed, exhibited a mist rating of 4 (this corresponds to an unacceptably high level of misting).

EXAMPLE 2

A conventional web offset lithographic newspaper ink was formulated from the following components:
Carbon Black: 20%
Low Mol. Wt. Hydrocarbon Varnish: 50%
Mineral Oil 2400 SUS: 20%
Bituminous Asphalt: 5%
Tridecyl Acid Phosphate: 5%

The ink formulation indicated above was tested at a speed of 1200 rpm on an Albert Thwing Inkometer and had a mist rating of 0. When tridecyl acid phosphate was omitted, a mist rating of 2 was obtained under the same conditions.

EXAMPLE 3

A letterpress newspaper ink system is formulated from the same types of components as in Examples 1 and 2, except that propylene carbonate is substituted for tridecyl acid phosphate. When this ink is printed, it is determined that the ink has a mist rating of 3, whereas the same system without propylene carbonate has a mist rating of 10.

EXAMPLE 4

A sheet-fed lithographic ink was formulated as follows:
Acrylic Flush: 29.0%
Quick-set Vehicle: 60.0%
Micronized Polyethylene Wax: 2.0%
Micronized "Teflon": 0.5%
Cobalt Drier: 3.0%
Drier Accelerator: 0.25%
Magie 500 Oil: 5.25%

The acrylic flush contained phthalocyanine blue pigment—14.2%, an isophthalic alkyd - 4.5%, an acrylic resin (AC-970)—5.2%, tridecyl alcohol—2.6%, "Texanol" isobutyrate—2.3% and Magie solvent—0.6%.

The quick-set vehicle consisted of a rosin-modified phenolic resin, a linseed oil alkyd—23.0%, Magie 500 solvent—15%.

The above formulation when tested of an Inkometer at a speed of 2,000 RPM had a mist rating of 4. When 10% of glycerol was added to the formulation, the mist rating was reduced to an acceptable level of 1.

What is claimed is:

1. A printing ink of low misting properties comprising a dispersion of about 5 to about 30 wt. %, based on the weight of the ink, of a pigment in a vehicle containing about 50 to about 95 wt. %, based on the weight of the vehicle of a hydrocarbon oil and about 0.1 to about 4 wt. %, based on the weight of the ink, of a compound selected from the group consisting of organic acid phosphate, glycerol and propylene carbonate.

2. The ink of claim 1 wherein the compound is present in an amount of 0.3 to 2 wt. %, based on the weight of the ink.

3. The ink of claim 1 wherein the compound is an organic acid phosphate.

4. The ink of claim 3 wherein the organic group in the organic acid phosphate is a straight of branched chain alkyl, aryl, alkaryl, aralkyl or heterocyclic group containing 2 to 16 carbon atoms.

5. The ink of claim 4 wherein the organic group is a straight chain alkyl group containing 8 to 13 carbon atoms.

6. The ink of claim 5 wherein the organic acid phosphate comprises tridecyl acid phosphate.

7. A printing process for reducing ink misting which comprises utilizing a printing ink comprising a dispersion of about 5 to about 30 wt. %, based on the weight of the ink, of a pigment in a vehicle containing about 50 to about 95 wt. %, based on the weight of the vehicle, of a hydrocarbon oil and about 0.1 to about 4 wt. %, based on the weight of the ink, of a compound selected from the group consisting of organic acid phosphate, glycerol and propylene carbonate.

8. The process of claim 7 wherein the compound is present in an amount of 0.3 to 2 wt. %, based on the weight of the ink.

9. The process of claim 7 wherein the compound is an organic acid phosphate.

10. The process of claim 9 wherein the organic group in the organic acid phosphate is a straight or branched chain alkyl, aryl, alkaryl, aralkyl or heterocyclic group containing 2 to 16 carbon atoms.

11. The process of claim 10 wherein the organic group is a straight chain alkyl group containing 8 to 13 carbon atoms.

12. The process of claim 10 wherein the organic group comprises tridecyl acid phosphate.

* * * * *